J. N. Peteler. Sheet 1. 2 Sheets.
Railway Track.
No. 3,280. Reissued Feb. 2, 1869.
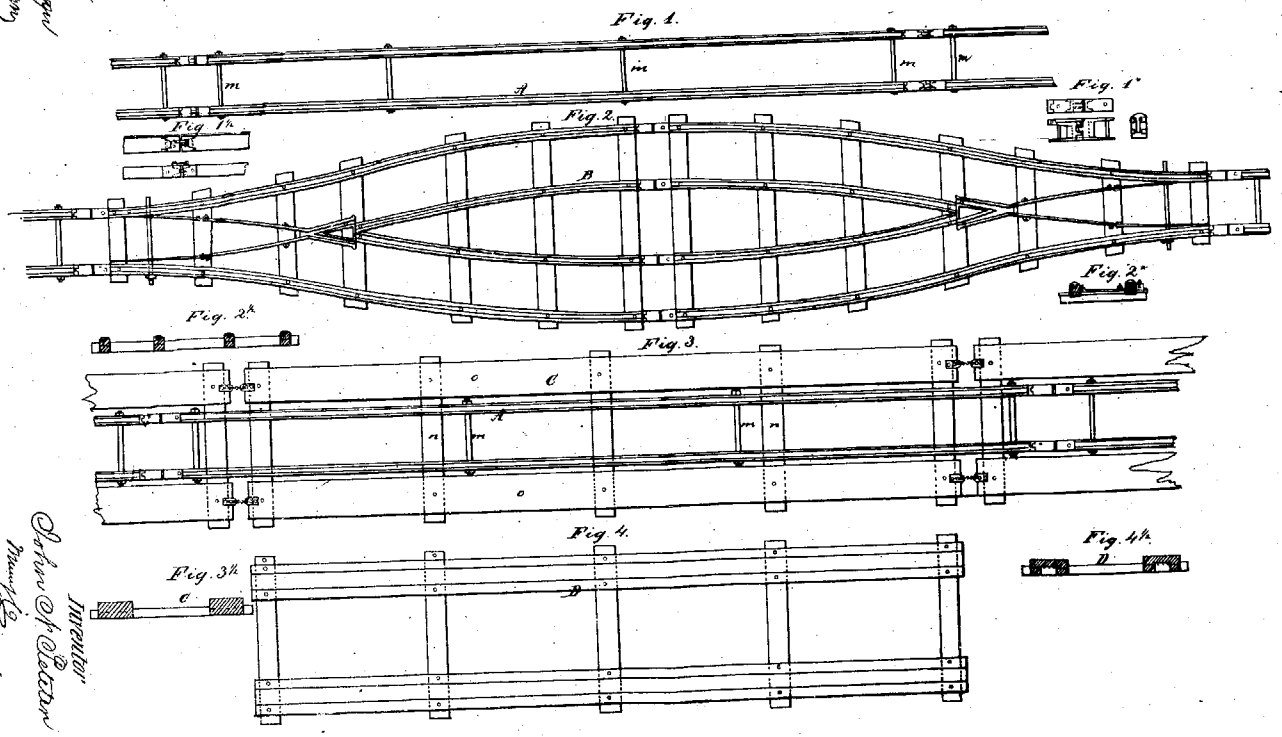
Witnesses.
Wm. Truman
J. M. E. Lynn
Inventor
John N. Peteler
Munn & Co.
Attorneys J. N. Peteler. Sheet 2. 2 Sheets.
Railway Track.
No. 3,286. Reissued Feb. 2, 1869.
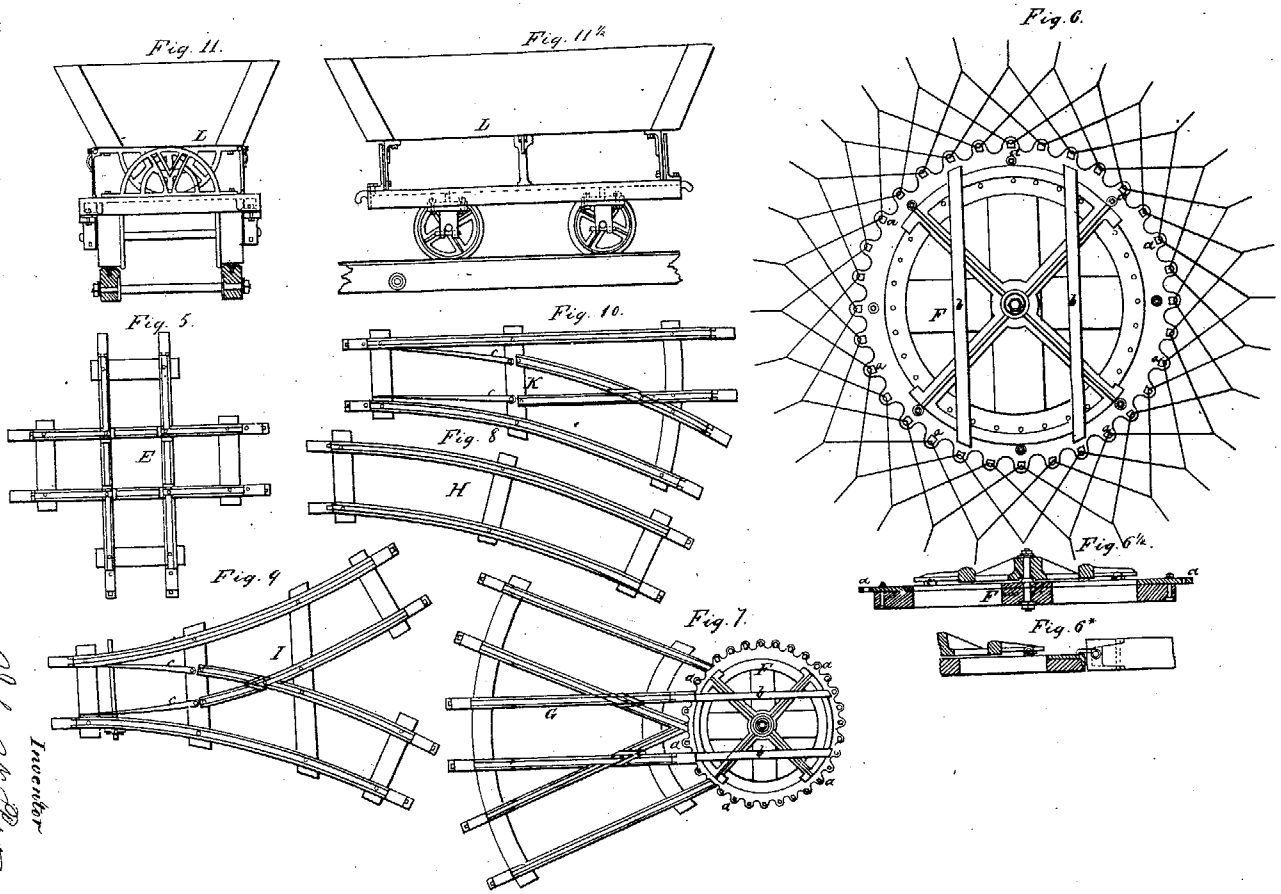
Witnesses.
Wm. Gregory
J. M. Lynn
Inventor
John N. Peteler
per Munn & Co
Attorneys United States Patent Office.

ALOIS PETELER, OF NEW BRIGHTON, NEW YORK, ASSIGNEE OF JOHANN N. PETELER.

*Letters Patent No. 57,826, dated September 4, 1866; reissue No. 3,286, dated February 2, 1869.*

IMPROVED PORTABLE RAILWAY.

The Schedule referred to in these Letters Patent and making part of the same.

*To all whom it may concern:*

Be it known that JOHANN N. PETELER, of Schepach, Kingdom of Bavaria, has invented a new and useful Improvement in Portable Railroads; and I, ALOIS PETELER, as assignee of the said JOHANN N. PETELER, do hereby declare the following to be a full, clear, and exact description thereof, which will enable those skilled in the art to make and use the same, reference being had to the accompanying drawing, forming part of this specification, in which drawing—

Figure 1 represents a plan of an ordinary section.

Figure 2 is a similar view of turn-out.

Figure 3 is a similar view of a supporting-frame with longitudinal connections.

Figure 4 is a similar view of the bridge.

Figure 5 is a similar view of a crossing.

Figure 6 is a similar view of a turn-table.

Figure 7 shows the turn-table and connections.

Figures 8, 9, and 10 show different constructions of curves.

Figures 11 and 11½ show an end view and a side view of a car.

The remaining figures show details or sections, and will be referred to as the description progresses.

The object of this invention is a portable railroad, which can be readily transported from one place to another, and easily put down or taken up, and which can be used with great advantage for passing over marsh-land, for building roads, or for engineering or building-operations in general.

The ordinary sections, A, are composed of two strips of wood, each about twenty or twenty-five feet long, three and a half inches high, and two and a half inches wide, oval on top, otherwise rectangular. If desired, strips of iron may be fastened to their upper surfaces by rivets or other means.

These strips or rails are connected by means of four (more or less) cross-ties, *m*, of cast iron, or other suitable material, which are secured in position by nuts screwed on their ends, or in any suitable manner.

Each of these sections is provided at one end with suitable dowels or hooks, and at the other with sockets or staples, so that the same can be readily and conveniently connected, and that, by connecting a series of sections, a road of any desired length can be formed.

The hooks and staples are shown in Figure 1½, and the dowels and sockets in fig. 1, but it must be remarked that any other suitable fastening may be applied to said sections, so that the same can be readily connected and disconnected.

If the portable railroad is much used, turn-outs, B, are required, such as shown in fig. 2.

Each turn-out is constructed of wooden rails, connected by cross-bars, as shown, and it is made in two halves, each half being provided with hooks and staples, or other suitable fastenings, at both ends, so that the two halves can be connected together at their wide ends, and attached to the sections A of the road at their narrow ends, as shown. When disconnected, each half can easily be carried by three men.

If, for particular purposes, a wider or longer turn-out should be required than the one shown in the drawing, it could be made in more than two parts, by cutting it up transversely or longitudinally to suit convenience.

By placing between the two halves of the turn-out one or more ordinary sections of rails, the turn-out can be prolongated to any desired distance.

Said turn-out is constructed, by preference, of oak wood, and not more than a few minutes are required to put it down or take it up.

In case the railroad is to be put down on made land or marshy ground, a supporting-frame, C, is required to prevent the rails from sinking into the ground by the weight of the cars.

The supporting-frames are constructed of a series of cross-ties, *n*, which extend transversely across the rails, and the ends of which are connected to boards, *o*, running parallel with the rails.

These longitudinal connections form the walks for the car-men, and they are united to each other by suitable fastenings, similar to those described in figs. 1, 1½, and 1×.

By these means supporting-frames are formed which are capable of supporting any weight to which they may be exposed; and said frames can be made so light that they can be readily put down or taken up by a few men.

For the purpose of crossing rivers or canals, I use a bridge, D, constructed as shown in fig. 4.

These bridges are similar in construction to the supporting-frames, but the longitudinal connections are stronger than those of said frames.

If a canal exceeding sixteen feet in width is to be crossed, the ends of the bridges are supported by suitable yokes, and in crossing rivers ordinary rafts are used.

Where one road crosses another, a crossing, E, is used, such as shown in fig. 5. These crossings are provided, at their ends, with suitable fastenings, so that they can be easily carried by two men, and that they can be laid down and taken up without trouble or loss of time.

In many operations, such as filling up low or marshy ground, or levelling hills, &c., a turn-table, F, is required, which is constructed as shown in figs. 6 and 7. It is made of a wooden rim about four feet in diameter, three inches high, and six inches wide, with a cross-shaped centre-piece of suitable strength.

The rim is strengthened by a cast-iron hoop, which is provided with ears, *a*, projecting beyond the circumference of the wooden rim.

Said ears are perforated with holes, into which the rails are hung, and by changing the rails in the various holes, cars can be run in thirty-two (more or less) different directions without moving the turn-table. The rails which are attached to its rim may be made to radiate in any desired direction.

On the turn-table are secured the rails *b*, so that they can be freely revolved on the centre-pin of said turn-table, and by driving a car on the rails, it can be readily turned to any desired direction, and a suitable stop or catch serves to retain said rails in position, when they have reached the desired direction.

By taking up the turn-table and putting it down in another spot, backward or forward, thirty-two (more or less) new directions are obtained, and by these means every square foot of a piece of ground can be reached.

The weight of the turn-table is such that the same can be conveniently carried by three men, and it can be easily laid down in any desired place.

The holes in the ears *a* may be cast in, and they may be made up and down, or in a horizontal direction, according to the construction of fastenings on the several sections of rails to be connected to the rim.

The rails *b*, which revolve on the centre-pin of the turn-table, must be so arranged that their surfaces are on a level with the rails attached to the ears *a*.

If desired, a combination-rail, G, may be secured to the turn-table, such as shown in fig. 7.

By the use of this combination-rail, several directions, which diverge under very acute angles, can be reached without requiring any change in the position of the turn-table or of the rails.

Where the road has to be laid in curves, sections H, T, and K, are used, such as shown in figs. 8, 9, and 10. These curved sections may either be made in the simple form shown in fig. 8, or two curves may be combined as shown in fig. 9, or a curved section may be combined with an ordinary straight section, as shown in fig. 10; and where two sections are combined, suitable frogs, *e*, are applied, so that the cars can be readily brought from one section to the other.

It is obvious that the shape of these curves, and their combination with each other, or with straight sections, can be changed in a great many different ways, to conform to the formation of a tract of land, although it must be remarked that the curves shown in the drawing are sufficient for almost any emergency which may arise.

The cars L used on my portable railroad must be low, so as to prevent them from swaying to and fro, or from tubling over, particularly where the road passes over soft or marshy ground, and great precaution must be taken in this respect, particularly because the gauge of the road cannot be made to exceed twenty-four inches without impairing the quality of being portable.

The cars must also be so constructed that they will open from both sides, and, in some cases, also from the ends.

The operation of this portable railroad is very simple, and it saves much time and labor. All the parts required for a line of one thousand feet can be carried by three ordinary wagons, and ten men can take up the road and lay it down in from one and a half to four hours, according to the formation of the ground.

Minor alterations in the road can be effected with little loss of time. Four men can take up and relay a turn-table in five minutes and a turn-out in ten minutes.

The expense of a line of one thousand feet is from four hundred to six hundred dollars, and it can be used in a great many operations.

In digging peat, filling up sunken or wet lands, leveling or building roads, and, in fact, in all building or engineering operations, the use of my road saves much time, labor, and expense. It has also been applied with great success in clay-pits, brick-yards, and mines.

Having thus described my invention,

What I claim as new, and desire to secure by Letters Patent, is—

1. In a portable railway, a section, A, composed of two rails, which are connected by cross-ties, *m*, and provided at their ends with hooks and staples, or any other suitable fastening, as shown and described.

2. A turn-out, B, made in two halves, which are provided at their ends with hooks and staples, or other suitable fastenings, as set forth.

3. A supporting-frame, C, composed of two rails, supported by cross-ties, *m*, which are connected by longitudinal boards, *o*, said rails being provided at their ends with hooks and staples, or other suitable fastenings, as shown and described.

4. A crossing, E, constructed as shown in fig. 5, and provided at its ends with hooks and staples, or other suitable fastening, as set forth.

5. The combination of the perforated ears *a* and turn-table F, constructed and operating substantially as described.

ALOIS PETELER.

Witnesses:
E. F. KASTENHUBER,
C. WAHLERS.